(No Model.) 2 Sheets—Sheet 1.
M. ALBERS.
NUT LOCK.
No. 550,119. Patented Nov. 19, 1895.
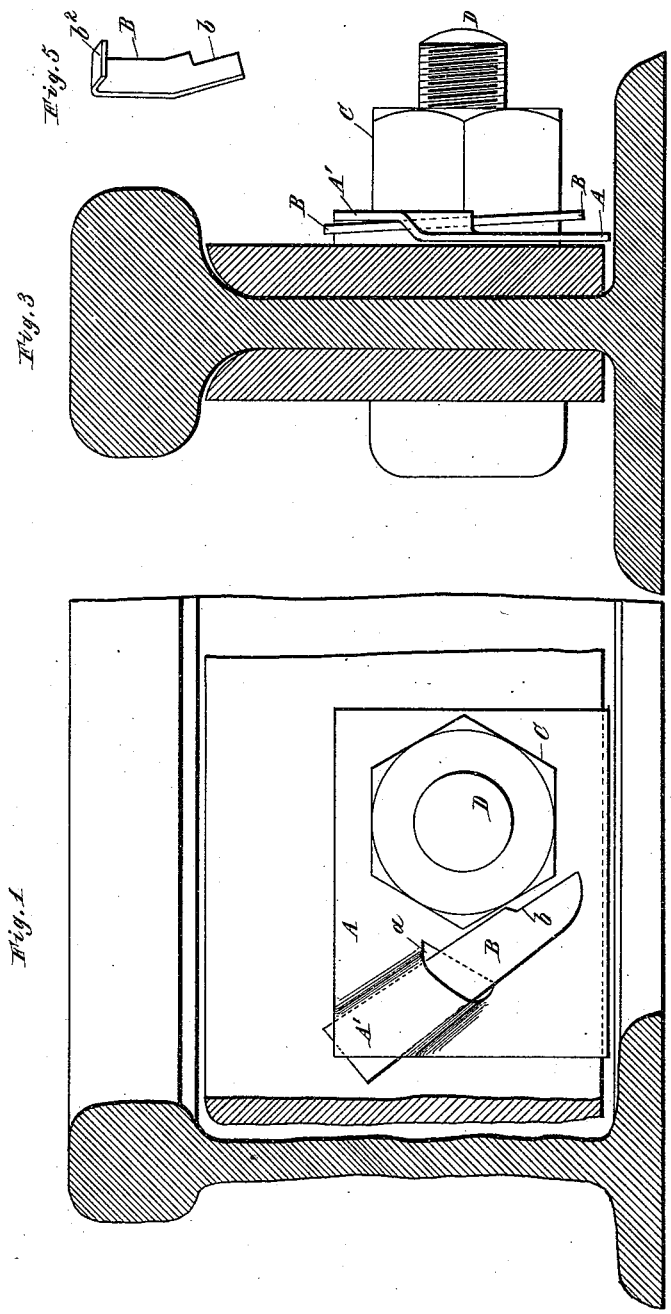
Witnesses.
Jos. H. Milans.
J. E. Hutchinson
Inventor.
Max Albers
By Graham & Low
attys (No Model.) 2 Sheets—Sheet 2.
M. ALBERS.
NUT LOCK.
No. 550,119. Patented Nov. 19, 1895.
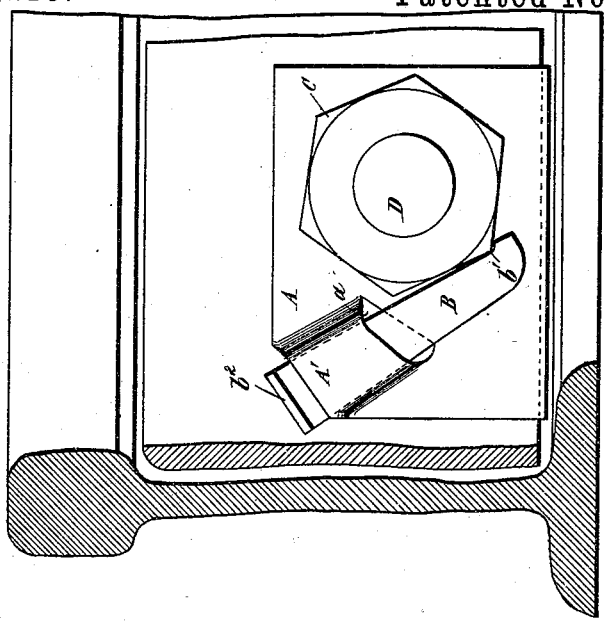
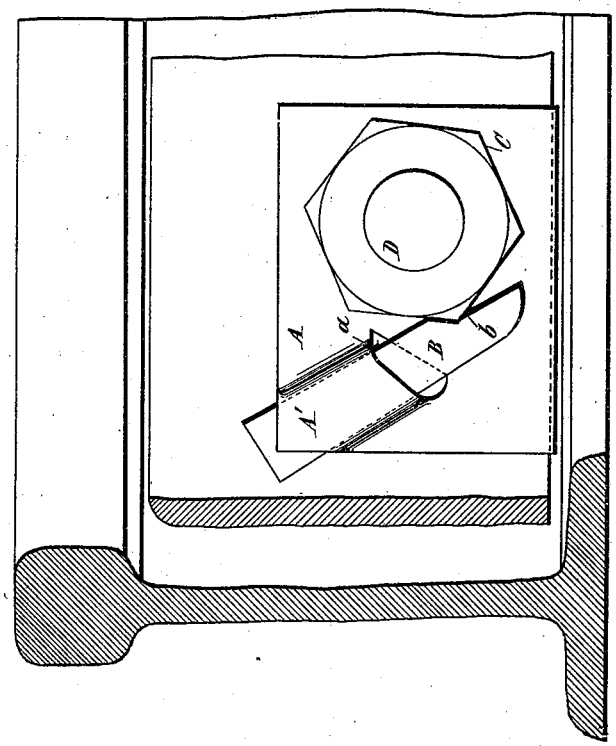
Witnesses
Jos. H. Milans.
J. E. Hutchinson
Inventor
Max Albers
By Graham & Low
Attys

UNITED STATES PATENT OFFICE.

MAX ALBERS, OF VOGELSANG, GERMANY.

NUT-LOCK.

SPECIFICATION forming part of Letters Patent No. 550,119, dated November 19, 1895.

Application filed February 18, 1895. Serial No. 538,823. (No model.) Patented in Germany January 30, 1891, No. 58,385; in Belgium May 21, 1891, No. 94,950; in England May 26, 1891, No. 8,943, and in Austria-Hungary October 4, 1891, No. 23,830 and No. 44,182.

*To all whom it may concern:*

Be it known that I, MAX ALBERS, a subject of the King of Prussia, German Emperor, residing at Vogelsang, Westphalia, in the Kingdom of Prussia, German Empire, have invented a new and useful Nut-Lock, (for which I have obtained a patent in the German Empire, No. 58,385, bearing date January 30, 1891; in Great Britain, No. 8,943, bearing date May 26, 1891; in Belgium, No. 94,950, bearing date May 21, 1891, and in Austria-Hungary, No. 23,830 and No. 44,182, bearing date October 4, 1891,) of which the following is a specification.

My invention relates to an improved nut-lock of that kind in which the nut is prevented from turning on its bolt when lodged in its final position by means of a wedge or pin arranged to bear against one side of the nut.

The method, in general, of locking a nut by means of a wedge or pin in contact with one side of the nut and without cutting or slotting the bolt is known.

The special and improved device of my invention is hereinafter described with reference to the accompanying drawings, in which—

Figure 1 is a front elevation of a portion of a rail and fish-plate secured to each other by a screw-bolt and nut, the nut-lock being applied but shown in a position when the locking is not yet complete. Fig. 2 illustrates the same parts, showing the nut in its fully-locked position by the improved nut-lock. Fig. 3 is a cross-section through the rail and fish-plate, showing the nut-lock in side elevation; and Fig. 4 is a view corresponding to Fig. 1, illustrating a modification in the shape of the locking-wedge, of which Fig. 5 is a perspective view drawn on a smaller scale.

The improved nut-lock of my invention consists of a washer A, of sufficient size to extend on one side of the nut, and in the said projecting portion of the washer a bridge A' is pressed or stamped into the washer, leaving a recess or aperture $a$, through which the locking wedge or key B may be passed, extending from the under side of the washer A to the upper side thereof and being guided within the said bridge A', the sides of which form a double shoulder or two opposing shoulders adapted to engage the sides of the key. I prefer to give the said bridge A' an oblique position, as shown in Figs. 1, 2, and 4; but this is not essential. The said bridge might as well be vertical in all cases. The wedge B, when introduced through the said bridge A', is guided or supported by the surface of the washer near the nut and must take a position adjacent to the side of the nut C and close thereto. The said wedge B is introduced when the nut C is not yet fully screwed down. When the wedge has been put in position, as shown in Fig. 1, an additional turn is given to the nut C, thereby forcing its edge against the side of the wedge B and jamming the said wedge within its guideway A', so as to prevent the same from moving in either direction. The lower end of the said wedge B may be preferably set off, as at $b$, Figs. 1 and 2; or it may be provided with a notch $b'$, Fig. 4, into which shoulder or notch the edge of the nut C is forced, the said shoulder $b$ or notch $b'$ providing an additional security against any tendency of the nut of becoming loose on its bolt D.

This nut-lock is extremely simple in construction and may be manufactured at a very cheap rate. It offers every desired guarantee and its application is of extreme facility. The opening $a$ may conveniently be formed in the act of stamping up the bridge, since it is at the end of the latter. The key may be made straight without outward bend or angle and may be inserted and driven in a direction toward the nut, and the key may lie flat upon the washer where it engages the nut.

If the nut is desired to be removed or loosened on its bolt, the nut requires only to be slightly turned to the left by a key, so as to come clear of the wedge B. The latter, then, may be readily withdrawn from the bridge A' and the nut is free to be farther unscrewed.

As shown in Figs. 4 and 5, the upper end of the wedge B may be bent at right angles to provide a lug $b^2$, which serves as a bearing-surface in forcing the wedge down and also as a hook for withdrawing the wedge from its bridge. The lower end of the said wedge may be slightly bent forward, as illustrated by Fig. 5, to increase its hold against the side of the nut.

I claim as my invention—

1. A nut lock comprising the combination of the following elements: a washer having an opening for the bolt and an opening for a locking key, said washer being constructed with a double shoulder formed by a bridge extending from the said opening for the key, and a key situated within said bridge between said shoulders, substantially as set forth.

2. A nut lock consisting of the combination of a washer having an opening for the bolt and formed with an elevation or bridge on the side of the washer toward the nut and an opening at the end of said bridge, and having a guiding or supporting surface between the said openings and a key situated within said bridge passing through said opening in a direction substantially parallel with the washer and adapted to engage the nut, substantially as set forth.

3. A washer for nut-locks having an opening for the bolt, bent or stamped to form a bridge for a key, having an opening at the inner end of said bridge, and between said openings a guiding or supporting surface upon which the nut and a key are adapted to rest in locking engagement, substantially as set forth.

4. A washer for nut locks having an opening for the bolt, formed with a bridge and having a key opening at the end of said bridge, between the same and the nut combined with a straight key within said bridge, extending directly through the key opening toward and adapted to engage the side of the nut, substantially as set forth.

5. As an article of manufacture: a wedge B, having its lower end set off as at $b$, or notched, as at $b'$, and its upper end bent as at $b^2$, in combination with a washer having a double shouldered bridge or recess to receive said wedge, substantially as and for the purpose set forth.

In testimony whereof I have signed my name to this specification in the presence of two subscribing witnesses.

MAX ALBERS.

Witnesses:
 FRITZ SCHROEDER,
 EVA HAUSEN.